3,178,484
PROCESS FOR PREPARING VINYL FLUORIDE AND 1,1-DIFLUOROETHANE
Frank Joseph Christoph, Jr., Elkton, Md., and Gunter Teufer, Chadds Ford, Pa., assignors to E. I. du Pont de Nemours and Company, Wilmington, Del., a corporation of Delaware
No Drawing. Filed Nov. 8, 1962, Ser. No. 236,413
2 Claims. (Cl. 260—653.4)

The present invention is directed to a process for reacting acetylene with hydrogen fluoride in the vapor phase and in the presence of a novel aluminum fluoride catalyst to form vinyl fluoride and 1,1-difluoroethane.

Aluminum fluoride has, of course, been known for many years. Unlike many other compounds, however, the aluminum fluoride known to the art has only one crystalline form. This form is a relatively poor catalyst for the reaction of hydrogen fluoride with acetylene for a number of reasons.

There are several catalysts known for the vapor phase reaction of acetylene with hydrogen fluoride besides the known aluminum fluoride; for example, aluminum oxide, aluminum sulfate and the like. All of the known solid catalysts have the distinct disadvantages of either causing poor conversions at reasonable feed rates or rather high yields of tars and other by-products.

It is, therefore, an object of the present invention to provide a new process for the vapor phase reaction of hydrogen fluoride with acetylene.

It is another object of the present invention to provide a new catalyst for the vapor phase reaction of hydrogen fluoride with acetylene to form vinyl fluoride and 1,1-difluoroethane.

These and other objects will become apparent from the following description and claims.

More specifically, the present invention is directed to a process for preparing vinyl flouride and 1,1-difluoroethane which process comprises passing a mixture of hydrogen fluoride and acetylene in the ratio of from about one to about five moles of hydrogen fluoride per mole of acetylene over gamma-aluminum fluoride catalyst at from about 250° to about 400° C., at a feed rate of from about 10 to about 4000 milliliters of acetylene at standard conditions per gram of catalyst per hour and at from 0.1 to 4 atmospheres, and recovering vinyl fluoride and 1,1-difluoroethane from the reaction mixture; said gamma-aluminum fluoride catalyst being prepared from $\beta$-aluminum fluoride trihydrate by heating at from 150° to 450° C. until water ceases to be evolved.

Gamma-aluminum fluoride is a previously undescribed crystalline form of aluminum fluoride. The well known, high temperature stable form of aluminum fluoride is called the $\alpha$-form herein by analogy with the various crystalline forms of alumina. The new gamma-form is similar to but different from the $\alpha$-form. The two are readily distinguished by the X-ray diffraction patterns of the crystals. The X-ray diffraction pattern of $\alpha$-aluminum fluoride is described on ASTM Card 9–138. It belongs to space group $D_3^7$–R32, has unit cell parameters $a = 4.927$ A. and $c = 12.445$ A. and a unit cell volume of 2615 A.$^3$, contains six molecules per unit cell and has a calculated density of 3.197 g./cc. The new gamma-aluminum fluoride belongs to space group $D_{3d}^6$–R$\bar{3}$C, has unit cell parameters $a = 5.01$ A. and $c = 12.28$ A. and a unit cell volume of 3459 A.$^3$, contains six molecules per unit cell and has a calculated density of 3.130 g./cc. Gamma-aluminum fluoride has the following X-ray diffraction pattern.

SPACING AND INTENSITIES OF GAMMA-AlF$_3$

| (d) A | Intensities | (hkl) | |
|---|---|---|---|
| 3.537 | vst | (200) | |
| 3.205 | w | (220) | |
| 2.134 | vw | (311) | |
| 2.042 | w | (222) | |
| 1.768 | st | (400) | |
| 1.623 | w | (331) | |
| 1.538 | mst | (420) | |
| 1.444 | w | (422) | |
| 1.363 | vw | (511) | (333) |
| 1.250 | vw | (440) | |
| 1.197 | w | (531) | |
| 1.179 | vw | (600) | (442) |
| 1.118 | vw | (620) | |
| 1.066 | vw | (622) | |
| 1.021 | vw | (444) | |
| 0.981 | w | (640) | |
| 0.946 | w | (642) | |
| 0.884 | w | (800) | |
| 0.858 | vw | (820) | (644) |
| 0.834 | vw | (822) | (660) |

St = strong, m = medium, w = weak, v = very.

The new gamma-aluminum fluoride has the VF$_3$ structure. There are holes in the crystals formed by 8 AlF$_3$ molecules but these are too small to occlude water or hydrogen fluoride. There may be a maximum of about 0.25 mole of water per molecule of aluminum fluoride in the crystal.

The only method presently known for preparing pure gamma-aluminum fluoride consists in dehydrating $\beta$-aluminum fluoride trihydrate at 150° C. to 450° C. At least 150° C. is preferred to decompose the hydrate. Dehydration temperatures greater than about 450° C. can be used but increasing amounts of undesired $\alpha$-aluminum fluoride are formed. At temperatures above 600° C. the high temperature $\alpha$-aluminum fluoride is the predominant product. The presence of $\alpha$-aluminum fluoride leads to a less active catalyst since $\alpha$-aluminum fluoride itself is a less active catalyst.

$\beta$-Aluminum fluoride trihydrate is prepared by the method described by Ehret and Frere in J. Amer. Chem. Soc., 67, 64 (1945). More specifically, it is prepared by dissolving aluminum or aluminum oxide in aqueous hydrofluoric acid and heating the solution to 60–100° C. for about 24 hours which causes the trihydrate to precipitate. If the dissolution and precipitation are carried out near 10–15° C. an aluminum fluoride hydrate AlF$_3$·9H$_2$O precipitates which loses six moles of water on standing in air to form $\alpha$-aluminium fluoride trihydrate; the $\alpha$- and $\beta$-aluminum fluoride trihydrates are readily distinguished by their X-ray diffraction patterns. The pattern for $\beta$-aluminum fluoride trihydrate is given on ASTM Card 9–108. Care should be taken that all of the $\alpha$-aluminum fluoride trihydrate is converted to the $\beta$-form by heating the solution or the resulting gamma-aluminum fluoride will not be pure, although the impure form is a useful catalyst and is not excluded from use herein.

In the present process gamma-aluminum fluoride in any suitable form such as powder, pellets or the like is placed in a reactor fitted with means for contacting gases with solids. The reactor and catalyst are heated to the desired reaction temperature and a mixture of anhydrous hydrogen fluoride and acetylene is passed over the catalyst. The reaction mixture of hydrogen fluoride and acetylene may be preheated. However, preheating the reaction mixture, although preferred, is not necessary to effect the desired reaction. The product issuing from the reactor consists of a mixture of hydrogen fluoride, acetylene, vinyl fluoride and 1,1-difluoroethane and, on some occasions, a number of other trace by-products. This mixture is separated into its constituent parts by any convenient means. Distillation is one such means; hydrogen fluoride (B.P. 19.4° C.) is easily separated from acetylene (B.P. −84° C.), vinyl fluoride (B.P. −72.2° C.) and 1,1-difluoroethane (B.P. −24.7° C.) and the organic materials are separable by properly designed distillation equipment under pressure. Alternate methods, known to the art, exist for separating the reaction products. The hydrogen fluoride and acetylene recovered may be recycled if desired.

The reaction is carried out at from about 250° C. to about 400° C. At temperatures below about 250° C. the reaction is too slow to be useful commercially. At temperatures above about 400° C., by-product formation becomes increasingly rapid. Above 500° C. the catalyst is slowly converted to the less active α-form and this is to be avoid. Although the active gamma-form can be converted to the less active α-form by heating, there is no way known for converting the less active α-form back to the more active gamma-form. Thus, once the catalyst is overheated and loses its activity, the activity cannot be regained.

The mole ratio of hydrogen fluoride to acetylene may vary from about one to about five. When the ratio is much below one the conversion of acetylene is undesirably low, resulting in excessively large amounts of acetylene which must be removed or recovered and recycled. Of course, some vinyl fluoride and 1,1-difluoroethane are formed but the process is commercially unattractive. The increasing amounts of hydrogen fluoride resulting from mole ratios much above five have little practical effect on conversion of acetylene to products. The larger amounts of hydrogen fluoride also result in larger recovery and recycle streams with no practical advantage. Since hydrogen fluoride is not monomeric in the vapor phase below about 60° C., the mole ratio cannot be determined from volume ratios unless the molecular weight of hydrogen fluoride vapor is taken into account. The mole ratio is best calculated from the weight of hydrogen fluoride fed per unit time. It is naturally understood that the mole ratio is for moles of monomolecular hydrogen fluoride per mole of acetylene.

Reaction pressures of from 0.1 to 4 atmospheres may be used. Generally it is preferred to operate at one atmosphere or above due to the increased difficulties of operating at subatmospheric pressure.

The feed rates of acetylene, using the mole ratios of reactants as discussed above, may be varied from about 10 to about 4000 milliliters of acetylene per gram of catalyst per hour. The volume of acetylene indicated is determined at 25° C. and one atmosphere pressure regardless of the reaction temperature and pressure used. The weight of the catalyst is based on the gamma-aluminium fluoride used excluding the weight of binders and the like which may be used to prepare pellets or similar forms. Contact times or residence times vary with feed rate, temperature and pressure. Since it is well known that determination of gas temperature in flow systems is subject to many errors and the calculation of contact times to many others, it is preferred to define the present process on the basis of the readily determined feed rates defined above which are not subject to these undetermined errors.

It has been found that increasing the reaction pressure above one atmosphere, keeping feed rate, mole ratios and temperatures contant, increased the conversion of acetylene to products. The relative yield of 1,1-difluoroethane compared to vinyl fluoride is not materially affected by a pressure increase. Hence, there is an economic advantage gained in higher conversions and productivity and smaller recycle streams by operating at superatmospheric pressures.

The preferred conditions of the present process are 300–350° C., 1.3 moles of hydrogen fluoride per mole of acetylene and 25–45 p.s.i.g. Acetylene feed rates of less than 400 ml./grams catalyst/hour are preferred. These preferred conditions lead to optimum yields of vinyl fluoride.

Vinyl fluoride is useful for preparing polymers, especially polyvinyl fluoride, a commercial product. 1,1-difluoroethane is useful as a refrigerant, propellant and as an intermediate for preparing chlorodifluoroethane (U.S. 2,899,472), vinylidene fluoride (U.S. 2,551,573) and other valuable products (U.S. 2,417,059; 2,549,767; 2,469,290). 1,1-difluoroethane may also be converted to vinyl fluoride by any of several known processes if desired (U.S. 2,599,631; 2,674,632).

The reactor and other equipment must be resistant to the action of hydrogen fluoride. If dry, steel may be used although it is preferred to use stainless steel, nickel or the high nickel alloys such as "Inconel" or "Monel" metals. The reactor may be heated in any manner known to the art which allows sufficient temperature control such as electric heaters, molten salt baths and the like. The starting materials should be reasonably anhydrous. Commercial anhydrous hydrogen fluoride contains slight traces of water which may be tolerated. Acetylene often contains acetone and other impurities, especially when it is stored in cylinders in acetone solution. Methods for removing acetone and other impurities and for drying acetylene are well known to the art. (See U.S. 2,716,142, col. 3, line 72 to col. 4, line 5.) The acetylene used in the examples which follow was thus purified.

Representative examples illustrating the present invention follow.

*Example I*

In a large polyethylene beaker, 800 g. of 48% hydrofluoric acid was diluted with water to a volume of 3200 ml. Hydrated alumina (400 g., C–33 grade from Alcoa) was added slowly to the acid at a rate which increased the temperature of the reaction mass to 60° C. After all of the alumina was added, heat was applied for 24 hrs. to maintain the temperature at 60° C. during which time precipitation occurred. About one-half of the original volume remained. The slurry was filtered while hot and the β-aluminum fluoride trihydrate collected was washed with water, then dried at 100° C. for four hours. The dry β-aluminum fluoride trihydrate was identified by its X-ray diffraction pattern. It was converted to gamma-aluminum fluoride by heating in a muffle furnace at 400° C. for four hours. The β-aluminum fluoride trihydrate may also be dehydrated by heating in the reactor described in the following example.

*Examples II–VIII*

A vertically mounted, tubular stainless steel reactor of one inch (inside diameter) was fitted for admitting gaseous acetylene and hydrogen fluoride at the bottom and allowing products to be removed at the top. Gamma-aluminum fluoride powder (110.9 g.) was placed in the reactor forming a bed 16 inches deep. The reactor was heated in a molten salt bath and a mixture of anhydrous hydrogen fluoride and acetylene was passed into the reactor at atmospheric pressure under the several conditions shown below. The effluent product was scrubbed with water and aqueous alkali to remove hydrogen fluoride, then analyzed for convenience by means of a mass spectrometer with the results shown below. The hydrogen fluoride, vinyl fluoride and 1,1-difluoroethane may also be separated by distillation if desired.

CONDITIONS

| Example | Mole ratio HF/C₂H₂ | Temperature, °C. | Acetylene feed rate, ml./g. catalyst/hr. | Remarks |
|---|---|---|---|---|
| II | 1.15 | 315 | 108.4 | |
| III | 2.28 | 315 | 71.6 | |
| IV | 2.24 | 315 | 97.2 | |
| V | 2.24 | 255 | 148.7 | 82 g. catalyst powder. |
| VI | 1.3 | 315 | 232.0 | 68 g. catalyst pellets. |
| VII | 1.3 | 350 | 153.8 | 88 g. catalyst powder. |
| VIII | 1.4 | 370 | 135.4 | 85 g. catalyst powder. |

RESULTS

| Example | II | III | IV | V | VI | VII | VIII |
|---|---|---|---|---|---|---|---|
| Mole percent products: | | | | | | | |
| Vinyl fluoride | 71.4 | 58.2 | 56.6 | 9 | 84 | 76 | 78 |
| 1,1-difluoroethane | 9.2 | 35.7 | 39.4 | 67 | 9 | 16 | 14 |
| Acetylene | 18.4 | 4.1 | 2.0 | 24 | 8 | 7 | 8 |
| Ethylene | 1.0 | 2.0 | 2.0 | trace | trace | trace | trace |
| Percent conversion of acetylene | 81.6 | 95.9 | 98.0 | 76 | 92 | 92 | 92 |
| Percent yield (based on acetylene converted): | | | | | | | |
| Vinyl fluoride | 87.5 | 60.6 | 57.8 | 11.8 | 91.3 | 81.7 | 84.8 |
| 1,1-difluoroethane | 11.5 | 37.2 | 40.4 | 88.2 | 8.7 | 18.3 | 15.2 |

*Examples IX–XIII*

In order to illustrate the superiority of gamma-aluminum fluoride as a catalyst over the previously known α-aluminum fluoride, the following examples were carried out in the apparatus described in the previous examples. α-Aluminum fluoride (209.7 g.), used as granulated material prepared by crushing pellets obtained from Harshaw Chemical Co., was placed in the reactor. The reactor was then heated in the molten salt bath as before and mixtures of anhydrous hydrogen fluoride and acetylene were passed into the reactor. The reaction conditions used and the results obtained are given below.

CONDITIONS

| Example | Mole ratio HF/C₂H₂ | Temperature, °C. | Acetylene feed rate, ml./g. catalyst/hr. |
|---|---|---|---|
| IX | 2.4 | 315 | 26.1 |
| X | 2.4 | 315 | 30.0 |
| XI | 2.4 | 315 | 43.8 |
| XII | 1.3 | 320 | 43.5 |
| XIII | 1.3 | 346 | 38.8 |

RESULTS

| Example | IX | X | XI | XII | XIII |
|---|---|---|---|---|---|
| Mole percent products: | | | | | |
| 1,1-difluorethane | 28.0 | 39.8 | 34.1 | 42.0 | 52.0 |
| Acetylene | 21.4 | 22.1 | 17.5 | 13.8 | 10.7 |
| Propane | 49.9 | 36.8 | 47.6 | 40.5 | 34.8 |
| Ethylene | 0.01 | 0.01 | 0.01 | 0.01 | 0.01 |
| Ethane | 0.8 | 0.6 | 0.4 | 1.7 | 3.8 |
| | 0.01 | 0.1 | 0.06 | 0.03 | 0.08 |
| Percent Conversion | 50.1 | 63.2 | 52.4 | 59.5 | 65.2 |
| Percent Yield (based on acetylene converted): | | | | | |
| Vinyl fluoride | 55.4 | 63.0 | 65.0 | 70.6 | 79.8 |
| 1,1-difluoroethane | 42.7 | 35.0 | 33.5 | 23.2 | 16.4 |

The reaction conditions in Examples IX–XIII were selected to obtain optimum results using the α-aluminum fluoride catalyst. Slower feed rates were used in Examples IX–XIII using the α-aluminum fluoride catalyst than in Examples II–VIII (using the gamma-aluminum fluoride catalyst) in order to obtain reasonable conversion. Higher conversions could be obtained than those in Examples IX–XIII (using even slower feed rates) but the yields would suffer. It should also be noted that lower feed rates increase somewhat the opportunity for by-product formation.

Comparing Examples IX–XIII with Examples II–VIII shows that the commercial α-form of aluminum fluoride is a much poorer catalyst than the new gamma-form of aluminum fluoride. The known α-aluminum fluoride causes conversions of acetylene approximately 50% lower at feed rates which are at least three to five times slower, i.e., production rates are from ⅕ to ⅒ that of the new catalyst. Since both the α- and the gamma-forms of aluminum fluoride are prepared from β-aluminum fluoride trihydrate, the only difference being the temperature to which the trihydrate is heated, it can be stated that the new gamma-form is inherently at least six to ten times more active than the known α-form. This is an entirely unexpected and surprising result.

*Example XIV*

Using the equipment and catalyst of Examples II–VIII, a reaction was carried out at 330° C., using an HF/acetylene mole ratio of 1.28/1, a feed rate of 250 ml. reactants (at 25° C. and one atmosphere)/gram catalyst/hr. and a reaction pressure of 25 p.s.i.g. The results are shown below.

RESULTS

Mole percent products:
  Vinyl fluoride _____ 77.9
  1,1-difluoroethane _____ 11.6
  Acetylene _____ 6.0
  Ethylene _____ 3.7
  Propylene _____ 0.1
  Others _____ 0.2
Percent Conversion _____ 94.2
Percent Yield:
  Vinyl fluoride _____ 79.8
  1,1-difluoroethane _____ 11.9
  By-products _____ 4.1

*Example XV*

Powdered gamma-aluminum fluoride (5.0 grams) was placed in a 0.9 x 20.3 cm. tubular reactor fitted in the same manner as the previous examples. Acetylene and hydrogen fluoride were passed into the reactor which was heated at 325° C. The mole ratio was 1.3 moles HF per mole of acetylene and the feed rate of acetylene was 3600 ml. (at standard condition)/gram catalyst/hr. The reaction pressure was 30 p.s.i.g. The product was recovered as before. The results are shown below.

RESULTS

Mole percent product:
  Vinyl fluoride _____ 79.5
  1,1-difluoroethane _____ 16.7
  Acetylene _____ 3.0
  Ethylene _____ 0.9
Percent conversion _____ 97.0
Percent yield:
  Vinyl fluoride _____ 81.2
  1,1-difluorethane _____ 17.0
  Ethylene _____ 1.8

It is understood that the preceding examples are representative and that said examples may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing vinyl fluoride and 1,1-difluoroethane which process comprises passing a mixture of hydrogen fluoride and acetylene at a temperature of from about 250° C. to 400° C. and at a pressure of from about 0.1 to about 4 atmospheres over gamma-aluminum fluoride catalyst, said catalyst obtained by dehydrating β-aluminum fluoride trihydrate at from about 150° C. to about 450° C. until water ceases to be evolved therefrom, said mixture of hydrogen fluoride and acetylene having a molar ratio of from about 1 to about 5 moles of hydrogen fluoride per mole of acetylene, the feed rate of acetylene in said mixture being from about 10 to about 4,000 milliliters, measured at standard conditions, per gram of catalyst per hour, and recovering from said reaction mixture vinyl fluoride and 1,1-difluoroethane.

2. A process for preparing vinyl fluoride and 1,1-difluoroethane which process comprises passing a mixture of hydrogen fluoride and acetylene at a temperature of from 300° C. to 350° C. and at a pressure of from 35–45 p.s.i.g. over gamma-aluminum fluoride catalyst, said catalyst obtained by dehydrating β-aluminum fluoride trihydrate at from about 150° C. to about 450° C. until water ceases to be evolved therefrom, said mixture of hydrogen fluoride and acetylene having a molar ratio of 1.3 moles of hydrogen fluoride per mole of acetylene, the feed rate of acetylene in said mixture being from about 10 to about 400 milliliters measured at standard conditions, per gram of catalyst per hour, and recovering from said reaction mixture vinyl fluoride and 1,1-difluoroethane.

References Cited by the Examiner

UNITED STATES PATENTS

| | | | |
|---|---|---|---|
| 2,471,525 | 5/49 | Hillyer et al. | 260—653.4 |
| 2,755,313 | 7/56 | Calfee et al. | 260—653.6 |

LEON ZITVER, *Primary Examiner.*

DANIEL D. HORWITZ, *Examiner.*